United States Patent [19]

Bentley

[11] Patent Number: 5,968,313
[45] Date of Patent: Oct. 19, 1999

[54] PROCESS FOR DEINKING PULP FIBERS USING ETHOXYLATED LANOLIN

[75] Inventor: Thomas Richard Bentley, North Yorkshire, United Kingdom

[73] Assignee: Morton International, Inc., Chicago, Ill.

[21] Appl. No.: 08/836,212

[22] PCT Filed: Nov. 13, 1995

[86] PCT No.: PCT/GB95/02651

§ 371 Date: May 7, 1997

§ 102(e) Date: May 7, 1997

[87] PCT Pub. No.: WO96/15315

PCT Pub. Date: May 23, 1996

[30] Foreign Application Priority Data

Nov. 12, 1994 [GB] United Kingdom ............... 9422878

[51] Int. Cl.$^6$ ........................................ D21C 5/02
[52] U.S. Cl. ............................................ 162/5
[58] Field of Search ............... 162/4, 5; 252/351, 252/352, 362.1

[56] References Cited

U.S. PATENT DOCUMENTS

| | | | |
|---|---|---|---|
| 4,360,439 | 11/1982 | Calmanti et al. | 252/61 |
| 4,390,395 | 6/1983 | De Ceuster et al. | 162/5 |
| 4,416,727 | 11/1983 | Elton et al. | 162/6 |
| 4,690,821 | 9/1987 | Smith et al. | 424/401 |
| 4,935,096 | 6/1990 | Gallagher et al. | 162/5 |
| 4,964,949 | 10/1990 | Hamaguchi et al. | 162/5 |
| 5,100,574 | 3/1992 | Urushibata et al. | 252/174.22 |
| 5,227,019 | 7/1993 | Borchardt | 162/6 |
| 5,258,099 | 11/1993 | Borchardt | 162/5 |
| 5,288,369 | 2/1994 | Ishibashi et al. | 162/5 |
| 5,417,808 | 5/1995 | Okamoto et al. | 162/5 |
| 5,449,763 | 9/1995 | Wulff et al. | 536/18.6 |
| 5,500,082 | 3/1996 | Chang et al. | 162/5 |
| 5,505,817 | 4/1996 | Rodriguez et al. | 162/5 |
| 5,658,426 | 8/1997 | Howell et al. | 162/5 |

FOREIGN PATENT DOCUMENTS

| | | | |
|---|---|---|---|
| 42 32 506 A1 | 3/1994 | Germany | A61K 7/075 |
| 4 202884 | 7/1992 | Japan | D21C 5/02 |
| 108434 | 8/1917 | United Kingdom . | |
| WO 91/14821 | 10/1991 | WIPO | D21C 5/02 |
| WO 94/07456 | 4/1994 | WIPO | A61K 7/06 |
| WO 96/15314 | 5/1996 | WIPO | D21C 5/02 |
| WO 97/04163 | 2/1997 | WIPO | D21C 5/02 |

OTHER PUBLICATIONS

Patrick K.L., "Paper Recycling", 1992, pp. 131–133, 155–157, Nov. 1992.
Motiuk, "Wool Wax Alcohols: A Review", SD&C Technical Section, *Journal of the American Oil Chemists Society*, vol. 56, (Jun., 1979), pp. 89–96.
Motiuk, "Wool Wax Acids: A Review", SD&C Technical Section, *Journal of the American Oil Chemists Society*, vol. 56, (Feb., 1979), pp. 27–33.
K. Motiuk, "Wool Wax Alcohols: A Review", SD&C Technical section of the *Journal of the American Oil Chemists Society*, Jun., 1979, vol. 56, pp. 89–96.
Barnett, Gabriel, "Lanolin and Derivatives", *Cosmetics & Toiletries*, Mar., 1986, vol. 101, pp. 23–44.
Excerpts from "Hawley's Condensed Chemical Dictionary", Twelfth Edition, pp. 229–230, 507–508, 681, 868, 1114, 1178 and 1225.
Porter, M.R., "Handbook of Surfactants", Blackie Academic & Professional, 1st–3rd edition, pp. 242–243, 1991/21994.

*Primary Examiner*—Dean T. Nguyen
*Attorney, Agent, or Firm*—Gerald K. White; George W. Rauchfuss, Jr.

[57] ABSTRACT

A process for recycling fiber products employs an aqueous deinking medium containing an effective amount of a collector chemical. The collector chemical comprises a surface active agent which is or can be derived from lanolin. Alkoxylated lanolin derivatives are preferred.

18 Claims, No Drawings

5,968,313

PROCESS FOR DEINKING PULP FIBERS USING ETHOXYLATED LANOLIN

BACKGROUND OF THE INVENTION

The invention relates to the recycling of fiber products, especially printed paper products. Particularly, although not exclusively, the invention relates to a collector chemical formulation for use in the recycling of fiber products and a process for recycling fiber products involving subjecting them to a mechanical treatment to separate fibers, removing print therefrom (commonly known as "deinking") and recovering the fibers.

The recycling of paper products is now an important industry. Initially, paper products, particularly for the box and board industry, were recycled without deinking. A later development was the use of waste paper as a source of fibers for the production of newsprint but now waste paper products can be deinked and used for higher quality papers, for example tissue, cartridge and writing papers.

A common method of paper recycling, called flotation deinking, is to subject waste paper to a mechanical pulping treatment to break the paper down into fibers in an aqueous medium, and then to use a flotation technique to remove ink, which may be followed by a washing step. To remove the ink, a chemical, commonly referred to as a collector chemical, is present, and air is introduced at the bottom of the flotation chamber. The air, in the presence of the collector chemical, transports ink to the surface of the aqueous medium. At the surface, the ink-rich foam is removed by mechanical means.

Within the deinking industry there is a well-established practice for the deinking of newspaper/magazine furnishes commonly used for newsprint production. This entails alkaline pulping at fairly high pH levels (10–11) for the detachment of ink from fibers followed by alkaline flotation with soaps, being alkali metal salts of selected non-alkoxylated fatty acids. These may be added (a) as fatty acids direct to the pulper whereby in-situ saponification occurs or (b) as fatty acids via an external intermediary saponification step with the resultant soap dosed to the pulper and/or to the deinking (typically flotation) cell or (c) as soaps or soap solutions per se to the pulper and/or to the deinking (typically flotation) cell.

Saponification requires a relatively high pH. However, a relatively high pH may lead to yellowing of the fiber pulp. To combat this, hydrogen peroxide is added during pulping. However, such conditions increase the chemical and/or biological oxygen demand of the effluent from the process. Furthermore, the subsequent process of paper making is either an acid or neutral process, so the more alkaline the aqueous medium in the deinking chamber is, the more acid is required for subsequent paper-making. Operating at a lower pH could therefore bring about substantial environmental benefits. It must also be borne in mind that there is a certain degree of hysteresis in the matter of pH of solutions containing paper pulp because of the absorption of alkaline or acid moieties within fibers.

Synthetic surface active agents, generally fatty acid alkoxylates and fatty alcohol alkoxylates, are sometimes used in deinking processes, instead of soaps, but are expensive, and may give rise to foaming which is difficult to control. Also, whilst they may give good results in laboratory tests, they are thought to work less well in commercial practice.

SUMMARY OF THE INVENTION

It is an object of the present invention to provide an advantageous process for recycling fiber products.

According to the invention, there is provided a process for recycling fiber products, the process employing an aqueous deinking medium containing an effective amount of a collector chemical which comprises a surface active agent which is or can be derived from lanolin.

Preferred are alkoxylated alcohols, alkoxylated polyols, alkoxylated acids, and esters of such alcohols, polyols and/or acids, when such alcohols, polyols, acids and esters are derived from lanolin or are of a type which can be derived from lanolin (whether or not they actually are derived from lanolin). They may be ethoxylated (EO), propoxylated (PO), butoxylated (BO), or treated with mixed alkylene oxides (EO/PO, EO/BO, PO/BO or EO/PO/BO), suitably with at least 1 mole average of the selected alkylene oxide(s), more suitably with at least 5, preferably with at least 10, and most preferably with at least 30. Preferred products are ethoxylated (EO), propoxylated (PO), or, most preferably, both (EO/PO).

Lanolin is the name given to derivatives of wool grease, and is an extremely complex mixture of compounds. Lanolin itself is predominantly composed of esters of higher fatty acids.

The alcohols which are parent compounds for the esters (generally called "wool wax alcohols") are predominantly sterols, with cholesterol, lanosterol and dihydrolanosterol being predominant, these three specific sterols normally constituting about 70% by weight of the total weight of the alcohols. Of the remaining weight, iso- and anteiso-mono $C_{14-36}$ fatty hydroxyalcohols predominate. Most of these further alcohols are monohydroxyalcohols though some, typically about 7% by total weight of alcohols, are dihydroxyalcohols.

The acids which are also parent compounds for the esters (generally called "wool wax acids") are predominantly fatty acids, but not the linear normal carboxylic acids found in many natural systems. Linear normal carboxylic acids may typically constitute only about 10% by weight of the total weight of the acid moieties of the lanolin esters. Rather, the lanolin fatty acids are characterised by two things:

chain branching, especially from the second or third carbon atom from the chain end (iso- or anteiso-acids)

the presence of hydroxyl groups, especially carried on the 2-carbon atom ($\alpha$-acids).

In a typical lanolin, the acids which provide the acid moieties of the esters are as follows (wt percentages given based on total weight of acids).

| | |
|---|---|
| $C_{8-40}$ iso-acids (i.e terminal isopropyl group) | 22 wt % |
| $C_{7-41}$ anteiso-acids (i.e. terminal isobutyl group) | 36 wt % |
| $\alpha$-hydroxy normal acids | 14 wt % |
| $\alpha$-hydroxy iso-acids | 12 wt % |

-continued

| | |
|---|---|
| α-hydroxy anteiso-acids | 4 wt % |
| ω-hydroxy normal acids | 3 wt % |
| ω-hydroxy iso-acids | 0.5 wt % |
| ω-hydroxy anteiso-acids | 1 wt % |
| | 92.5 wt % |
| Balance | 7.5 wt % |

It will be appreciated that very many esters may be formed by reaction between such alcohols and acids. The predominant products, however, are believed to be esters of sterols and iso-, anteiso- or α-hydroxy fatty acids.

It should be noted that normal fatty acids and alcohols, having a straight chain and a hydroxy group carried at the terminal position are only minor products of lanolin, only theoretically derivable therefrom. Such acids and alcohols can be better derived from many other sources and are not per se within the ambit of the present invention (unless esterified with one of the compounds referred to in the foregoing paragraphs, on lanolin and its derivatives).

It has been found that good results are obtained when a, or the, surface active agent used in the invention is derived from lanolin itself; or, following hydrolysis, is a fatty acid, an alcohol or a polyol obtained therefrom; or is a product derived from any of the foregoing, for example by alkoxylation.

The predominant compounds, both the acids and the alcohols, which constitute lanolin may be derivable from other sources. For example sterols such as cholesterol, or branched fatty acids, may be derived synthetically and/or from some animal fats or tissues.

The invention may employ a surface active agent, being a compound of a type found in lanolin, or produced from such a compound, for example by alkoxylation, whether or not actually derived from lanolin. In particular, the invention may employ a surface active agent produced (for example by alkoxylation) from a compound selected from one or more of the following:

a sterol, preferably cholesterol, lanosterol or dihydrolanosterol; a $C_{14-36}$, preferably $C_{18-28}$, iso- or anteisomonoalochol; a $C_{8-40}$, preferably $C_{12-28}$, iso-acid; a $C_{7-41}$, preferably $C_{13-29}$, anteiso-acid; a $C_{10-34}$, preferably $C_{14-26}$, α-hydroxy acid; a $C_{22-36}$, preferably $C_{24-32}$, ω-hydroxy acid; an ester with any alcohol or acid, as appropriate, of any of the foregoing; and an ester of any alcohol of the foregoing and any acid of the foregoing.

Of the foregoing, the preferred starting compounds for the preparation of a surface active agent, for example by alkoxylation, are the sterols and the branched alcohols, and esters thereof; and the iso-, anteiso- and α-hydroxy acids, and esters thereof.

For further information about lanolin and its constitution, reference is made to the following articles:

Wool Wax Alcohols: A Review—K. Motiuk, Journal of the American Oil Chemists' Society, Vol. 56, June 1979, pg 651–658.

Wool Wax Acids: A Review—K. Motiuk, Journal of the American Oil Chemists' Society, Vol. 56, February 1979, pg 27–33.

Lanolin and Derivatives: G. Barnett, Cosmetics and Toiletries, Vol. 101, March 1986, pg 23–44.

A preferred lanolin-type surface active agent is readily soluble in water, at least at a temperature above 40° C. Suitably it has an HLB value of at least 4, preferably of at least 10, most preferably of at least 14.

It has been found that a collector chemical of the type described is surprisingly effective in the deinking of fiber products compared to the use of known collector chemicals which may only comprise a conventional (non-alkoxylated) soap. It has further been found that, at least in some deinking processes, a collector chemical containing a lanolin-type surface active agent of the type described may be more effective than the use of fatty acid emulsions, added to the aqueous medium, the emulsions being two-phase formulations, containing a fatty acid collector chemical and an emulsifying agent. It has further been found that, at least in some deinking processes, a collector chemical comprising a lanolin-type surface active agent of the type described may be more effective than synthetic surface active agents of the alkoxylated fatty acid or alcohol types.

A conventional soap may be used in addition to the said lanolin-type surface active agent, but it is found that often a conventional soap is not needed. When one is present, its concentration in the deinking process can be reduced in comparison with conventional methods without reducing performance. This is desirable in terms of simple economics and efficient running of downstream papermaking machines: lower soap residues generally mean that papermaking machines work more reliably. This reduction in soap usage also has significant environmental benefits, for example in effluent treatment.

Furthermore, a process in accordance with the invention may, if desired, be carried out at a lower pH than is conventional.

A soap when used, may be, or may be derivable from, saturated fatty acids, mono-unsaturated fatty acids, di-unsaturated fatty acids and tri-unsaturated fatty acids, and fatty acids with hydroxy groups in the chain of the molecule; or from mono-di- and tri-glycerides of the fatty acids. The term "soap" as used herein denotes such products which are not alkoxylated. It will be appreciated by those skilled in the art that the commercially available fatty acids (and consequently derivatives thereof) will typically comprise a mixture of different fatty acids (or derivatives thereof) most of which will include $C_{12-22}$ hydrocarbon moieties. Examples of fatty acids used or from which the conventional soap may be derived include lauric acid, myristic acid, palmitic acid, stearic acid, palmitoleic acid, oleic acid, linoleic acid, linolenic acid, arachidic acid and erucic acid.

Optionally a further surface active agent may be present in the aqueous medium, selected from alkoxylates, for example alkylphenol alkoxylates, alcohol alkoxylates, polyol alkoxylates, amine alkoxylates, ester alkoxylates and acid ethoxylates; sulphonates, for example alkylaryl sulphonates, alkane sulphonates; alkane sulphates, for example sodium lauryl sulphates; ether sulphates, for example sodium lauryl ether sulphates; alkane phosphates; and esters of alkylene oxide polymers. Preferred further surface active agents include alkoxylated normal (straight chain) $C_{8-26}$ fatty alcohols and esters thereof, and alkoxylated normal (straight chain) $C_{8-26}$ fatty acids and esters thereof. Alkoxylated products may be ethoxylated (EO), propoxylated (PO), butoxylated (BO), or treated with mixed alkylene oxides (EO/PO, EO/BO, PO/BO or EO/PO/BO) suitably with at least 1 mole average of the selected alkylene oxide, more suitably with at least 5, preferably with at least 10, and most preferably with at least 20. Preferred products are ethoxylated (EO), propoxylated (PO), or, most preferably, both (EO/PO).

The process of the present invention may be a wash deinking process. In such a process the ink which has been carried into the aqueous medium is removed, by successive steps of draining and washing the paper pulp. The process may also be a flotation deinking process, as described above. Combined wash and flotation processes are also possible. The term "collector chemical" is sometimes not used in the context of wash deinking, the term "dispersant" sometimes being favoured. However, in this specification the term "collector chemical" will be used in the context of any deinking process.

Thus, the process of the invention preferably comprises subjecting the fiber product to a mechanical treatment (pulping) in an aqueous medium until substantially broken down into fibers; adding to the medium, before, during or after the mechanical treatment, said collector chemical; removing ink by successive cycles of draining and rinsing and/or passing a gas, commonly air, through the aqueous medium containing the fibers and the collector chemical and removing the ink-rich foam on the surface; and recovering the cleansed pulp.

Preferably the process is a flotation deinking process.

The pH of the aqueous medium during pulping may suitably be in the range 6–11.5. 10–11 is commonly employed but advantageously, the process of the invention enables a lower pH to be used. Thus, the pH of the aqueous medium during pulping is preferably 9 or less and, more preferably, 8.8 or less. A preferred range is 7–8.8.

The pH of the aqueous medium during ink removal from the deinking vessel (for example washing/rinsing in wash deinking; flotation during flotation deinking) may suitably be in the range 6–11.5, preferably 6.5–9. 8–8.5 is commonly used, but advantageously the process of the invention enables a lower pH to be used. Thus, the pH of the aqueous medium in steps subsequent to pulping, for example during flotation and/or washing, is preferably 8 or less and, more preferably, 7.5 or less. A preferred range is 6.5 to 7.5.

Preferably, at least a portion of the collector chemical employed in the present invention is added at the pulping stage.

Hydrogen peroxide additions, used to reduce yellowing, may be reduced or eliminated in accordance with the invention, especially under the reduced pH conditions. Silicate additions may likewise be reduced or eliminated, especially under the reduced pH conditions.

The invention is particularly advantageous in the removal of ink from newsprint and magazine furnishes, whether woody or woodfree.

The examples below may include the addition of various standard materials to the pulper and/or flotation cell, for example sodium hydroxide or sulphuric acid, to alter pH, sodium silicate as a buffer and/or alkalinity agent and/or anti-redeposition agent, hydrogen peroxide as a whitener, and calcium chloride for water hardness control. It should be noted that none of these are essential integers of any aspect of the present invention; they may be altered or omitted at will.

The invention is very flexible in its use, in that a collector chemical comprising a lanolin-type surface active agent alone is highly efficient in deinking paper on its own, without any further removal agent being present in the aqueous medium. It is also effective when used in conjunction with other surface active agents not of lanolin-type. It is also effective in conjunction with a conventional soap. Moreover even when the soap or soap precursor is the major collector chemical component by weight in the aqueous medium, and the relative amount of the lanolin-type chemical is small, it still may exert a pronounced effect on the deinking process.

Thus, in one series of embodiments the lanolin-type surface active agent is the only collector chemical present. We have found that it can be effective at extremely low concentrations, for example as low as 0.01 wt % on weight of dry paper, in one set of tests. A suitable range may be 0.005–2 wt %, preferably 0.01–1%, most preferably 0.02–0.6%.

In another series of embodiments it can be used with a conventional soap. The lanolin-type surface active agent and the soap can be added separately at different times; or they can be added separately, but at the same time. Alternatively, they can be co-formulated. Preferably, such a co-formulation, when used, is a solid at 25° C., and is dissolved in the aqueous medium for use in the process of the invention. A suitable concentration of such a co-formulated collector chemical is 0.005–2 wt % on weight of dry paper, preferably 0.01–1.5%, most preferably 0.1–1.2 wt %.

When used with a conventional soap the lanolin-type surface active agent may be a minor product in weight terms (preferred ratios being given below) and yet have a pronounced influence on deinking efficiency, leading to less usage of soap.

The lanolin-type surface active agent may be used in conjunction with one or more surface active agents not being of lanolin-type, and not being a soap, the ratio by weight of the lanolin-type surface active agent to the other surface active agent(s) taken in total suitably being in the range 30–99.9%:70–0.1%, preferably 40–90%:60–10%. The mean HLB value is suitably at least 4, preferably at least 10, and most preferably at least 14.

When a lanolin-type surface active agent is used with a soap the relative proportions, by weight, on the one hand of the total surface active agent(s)—including the lanolin-type surface active agent and all other surface active agents employed—and on the other hand of the soap, may suitably be 1:5–999, preferably 1:7–198, more preferably 1:18–180, and most preferably 1:28–90.

When they are co-formulated, said co-formulation is preferably a single phase formulation comprising 50–99.9% of a soap in combination with 0.1–10% of the total complement of surface active agents, with any balance comprising water and/or other additives.

A said co-formulation preferably comprises 70–99 wt % of said soap, more preferably 80–99 wt %, most preferably 84–90 wt %.

A said co-formulation preferably comprises 0.5–6 wt % of surface active agents (total complement thereof) and, more preferably, comprises 0.5–5 wt % thereof. Especially preferred is a case wherein the formulation comprises 1 to 3 wt % of surface active agents (total complement thereof).

Essentially for ease of transportation, said co-formulation is a concentrate, to be diluted into the said aqueous medium in use. A concentrate preferably comprises less than 20 wt % and, more preferably, less than 15 wt % of water. Especially preferred is the case wherein said co-formulation comprises less than 12 wt % of water.

The invention extends to such a co-formulation per se.

References herein to a soap include a soap precursor to be saponified to a soap during deinking.

The invention will now be further described, by way of example.

The following products were tested in the Examples:

SERFAX S100—a sodium salt of selected fatty acids. The fatty acids are selected typically to give an Iodine Value of 8.3. The acid value is typically 205. It is a solid soap, sold in either pellet or needle form. The solubility in water at 65° C. is typically 200 g/l.

SERFAX DB—a sodium soap of fatty acids, selected to give an Iodine Value typically of 55. The acid value is typically 198. The solubility in water at 60° C. is typically 200 g/l. It is a solid soap sold in either pellet or needle form.

SERFAX RP100—a sodium salt of fatty acids, selected to have an Iodine Value typically of 55, and an acid value typically of 205. The solubility in water at 60° C. is 200 g/l.

SOLAN E—an ethoxylated (75) lanolin, having an HLB value of approximately 16.

CRODET S100—a PEG 100 stearate or polyethoxy (100) stearic acid having an HLB value of approximately 19.

CRILLET 1—an ethoxy (20) sorbitan mono laurate or polysorbate 20 having an HLB value of approximately 17.

SERFAX DBE—a solid soap made up of 98 wt % SERFAX DB and 2 wt % E/VOL.

SOLAN B30—ethoxy (30) lanolin fatty acids having an HLB value of approximately 15.

VOLPO CS20—ethoxy (20) cetostearylalcohol having an HLB value of approximately 16.

SOL/VOL—a mixture of SOLAN B30 and VOLPO CS20 both as supplied, in a 1:1 ratio by weight.

E/VCL—a mixture of SOLAN E and VOLPO CS 20 both as supplied in a 1:1 ratio by weight.

LANEXOL—a polyethoxy (50) propoxy (12) lanolin having an HLB value of approximately 13.

LAN/VOL—a mixture of LANEXOL and VOLPO CS20 both as supplied, in a 1:1 ratio by weight.

SERFAX DBL—a solid soap made up of 98 wt % SERFAX DB and 2 wt % LANEXOL.

HARTOLAN DIST—distilled wool wax alcohols.

HARTOLAN TECH—a lower grade (the first "cut") of distilled wool wax alcohols than HARTOLAN DIST.

wool pitch—the distillation residue from HARTOLAN.

cholesterol—derived from lanolin.

POLYCHOL 5—ethoxy (5) distilled wool wax alcohols. Its HLB is 7.3.

POLYCHOL 40—ethoxy (40) distilled wool wax alcohols. Its HLB is 16.4.

SERFAX A100—a commercial fatty alcohol ethoxylate.

RS GAG—a commercial fatty alcohol ethoxylate. lanolin acid.

LANFA TECH—a grade of wool grease fatty acids.

AGNOSOL 5—ethoxy (5) wool grease fatty acids.

AGNOSOL 24—ethoxy (24) wool grease fatty acids.

LIONSURF 727—a commercial deinking collector chemical, not of lanolin type.

FLUILAN—liquid lanolin/lanolin oil—a fraction comprising lower melting point esters of lanolin.

CORONET—a solid lanolin fraction—essentially the hard solid left after removal of the FLUILAN fraction.

8000P—a commercially available emulsified fatty acid.

SERFAX S100, SERFAX DB, SERFAX RP100, SERFAX DBE, SERFAX DBL and SERFAX A100 are Trade Marks of Stephenson Group Limited of Bradford, United Kingdom. SOLAN B30, SOLAN E, VOLPO CS20, CRODET S100, CRILLET 1, HARTOLAN DIST, HARTOLAN TECH, POLYCHLOL 5, POLYCHLOL 40, LANFA TECH, AGNOSOL 5, AGNOSOL 24, FLUILAN, CORONET and LANEXOL are Trade Marks of Croda Chemicals Limited and/or Croda Surfactants Limited, of Goole, United Kingdom. 8000P is a Trade Mark of Eka Nobel, of Sweden. RS GAG is a Trade Mark of Dr. Kolb, of Switzerland. LIONSURF 727 is a Trade Mark of Lion Industries, of the United States of America.

General Information on Methods Used

Each "Set" of examples referred to below was carried out on waste paper which was pre-pulped and then divided into batches for the tests within the set. In all cases, however, care was taken to provide a very consistent supply of waste paper for all of the tests, so that some comparison of results between sets can validly be made.

Unless otherwise stated the pH conditions were standard alkaline conditions of 10.0±0.5 in the pulper and 8.5±0.5 in the flotation cell, adjusting with 0.5 M sodium hydroxide or 0.5 M sulphuric acid as necessary. Under such conditions 1 wt % hydrogen peroxide (30% w/v) and 2 wt % sodium silicate solution were added to the pulper, calculated on weight of dry paper.

Where pseudo-neutral conditions are specified, the pH during pulping was 8.5±0.5. 1 wt % hydrogen peroxide (30% w/v) was added to the pulper. However, sodium silicate was not added. The pH during flotation was 7.0±0.5.

Where neutral conditions are specified, the pH during pulping was 7.0±0.5. Neither hydrogen peroxide or sodium silicate was added. The pH during flotation was also 7.0±0.5.

The proportion of newsprint to magazine furnish was 60/40 by weight, unless otherwise stated.

To make the single phase co-formulations of soaps, when used, the selected surface active agent(s) were added to a hot liquid soap and mixed thoroughly. The soap formulation was then pelletised and cooled.

The waste paper was added to a pulper and, if required at this stage, a collector chemical addition was made. A standard amount of water was added.

The waste paper was then pulped to mechanically break down the paper substantially into fibers. The temperature was maintained at 45° C.–50° C. A homogeneous sample of pulp was split into portions and these were repulped with different test products. These different test products may liberate differing amounts of ink from the pulp. These differing amounts of ink may or may not be removed by preparing samples for the brightness evaluation described below. This is a brief explanation of the variations in pre-flotation brightness, as shown in the Tables which follow.

Brightness evaluation itself entailed removal of a small sample, for example a few grams, of the pulp, and allowing the water to drain from it, through a wire mesh. The brightness on one side of the sample on the wire mesh may differ from the brightness on the other side. Hence, the brightness of both sides was measured, using a 575 PHOTOVOLT (Trade Mark) reflectance meter, and the results were averaged to give the values mentioned below. The remainder of the paper pulp, from which the sample was taken, was then added to a standard laboratory flotation cell. If required at this stage, a collector chemical addition was made. A standard amount of water was added and calcium chloride was added to give a $Ca^{2+}$ concentration of 220 ppm. The temperature was maintained at 40–45° C.

Two flotation cells were used for the tests. A VOITH cell, when used, was allowed to run for 15 minutes at 45° C. with an air flow of 4 liters/minute. A LAMORT cell, when used, was run for 8 minutes at 45° C. as recommended by the manufacturer.

At the end the brightness of the pulp was measured by the method described previously. Although the post-flotation samples tend not to show much variation from one side to the other, the brightness of both sides was again measured, and the results averaged.

The effectiveness of a collector chemical formulation was assessed by comparing the brightness of the pulp before entering the flotation cell and the brightness after leaving the flotation cell after deinking. The results are shown in the tables, in which the "Float Gain" is the difference between the brightness post flotation and pre-flotation.

Unless otherwise stated, the method described above was used for the examples described below. In these examples, the symbol "C" denotes a comparative example, and that a set contains at least one comparative example. The symbol "I" denotes that a set contains examples of the invention. Individual examples in accordance with the invention are just given a number, and no letter.

In the Tables, the abbreviation "saa" stands for "surface active agent(s)".

Set 1 (I)

Assessment was made of the effectiveness of a co-formulated collector chemical comprising 3 wt % of SOL/VOL as the lanolin-type surface active agent and approximately 97% of SERFAX S100 soap. Addition was made to the pulper alone, to the flotation cell alone, and to both, in a split addition. The results are shown in Table 1.

Set 2 (C)

0.6 wt % of SERFAX S100 was added to the flotation cell for comparison with Set 1. Results are shown in Table 2.

Set 3 (I and C)

Assessments were carried out as described in Set 1, but with variations of the point of addition, separately, of soap and lanolin-type surface active agent. Results are shown in Table 3.

Set 4 (I)

Assessments were carried out as described in Set 1 using a co-formulation in pellet form comprising the soap SERFAX DB (97 wt %) mixed with the SOL/VOL (3 wt %) lanolin-type surface active agent. The amount of the co-formulation added to the pulper was incrementally increased. The pre-flotation and post-flotation brightness were measured and the results are shown in Table 4.

Set 5 (C)

Assessments were carried out for comparison with Set 4. The amount of soap SERFAX DB without the SOL/VOL surface active agent added to the pulper was incrementally increased in the same way as in Set 4. Results are shown in Table 5.

Set 6 (I and C)

Assessments were carried out into the effect on post-flotation brightness and brightness gain of varying the amount of the SOL/VOL lanolin-type surface active agent in a co-formulation comprising the SOL/VOL and the soap SERFAX DB (3 wt %:97 wt %) Results are shown in Table 6.

Set 7 (I and C)

Assessments were carried out as for Set 6, but with all the soap flotations being added to the flotation cell. Results are shown in Table 7.

Set 8 (I)

Assessments were carried out into the effect of lowering the pH on the effectiveness of the collector chemical co-formulations. The pseudo neutral conditions described above were used. Results are shown in Table 8.

Set 9 (C)

Assessments were carried out for comparison with Set 8 using conventional deinking soap (either SERFAX S100 or SERFAX DB). Results are shown in Table 9.

Set 10 (I and C)

Assessments were carried out on a range of surface active agents co-formulated with SERFAX DB. In each case approximately 2 wt % of the surface active agent was added to the hot liquid soap, prior to pelletization. The results are shown in Table 10.

Set 11 (I and C)

Assessments were carried out under pseudo neutral conditions as described above. The results are set out in Table 11.

Set 12 (I and C)

This was a repeat of Set 11 except that it was under normal alkaline conditions. The results are set out in Table 12.

Set 13 (I and C)

Assessments were carried out by the method used for Set 12. The results are set out in Table 13.

Set 14 (I)

Assessments were carried out by the method used for Set 12. The results are set out in Table 14.

Set 15 (I and C)

Assessments were carried out by the general method described above, using SERFAX DB in comparison with SERFAX DBE and SERFAX DBL. Results are set out in Table 15.

Set 16 (I and C)

Assessments were carried out to compare SERFAX DBE with SERFAX DB, to deink a paper pulp made up of 50 wt % newsprint, 25 wt % magazine furnish and 25 wt % telephone directories. Results are set out in Table 16.

Set 17 (I and C)

Assessments were carried out adding amounts of SERFAX S100 to the cell, and no or a standard amount of E/VOL to the pulper. Results are set out in Table 17.

Set 18 (I and C)

Assessments were carried out to assess the effectiveness of various alcohol surface active agents, alone, as collector chemicals. The concentration of collector chemical (weight of active ingredient) was 0.15% on weight of dry paper; all of collector chemical was added to the pulper; and the deinking conditions were neutral. The results are set out in Table 18.

Set 19 (I and C)

The assessments of Set 18 were repeated, but using a wood free paper, and 0.1% of collector chemical (weight of active ingredient) on weight of paper. The results are set out in Table 19.

Set 20 (I and C)

Assessments were carried out to determine the effectiveness of various lanolin-derived fatty acid surface active agents alone, as collector chemicals, in comparison with the standard commercial soap SERFAX DB. In each test normal alkaline conditions were employed; the concentration of the collector chemical (weight of active material itself) was 0.6% on weight of paper; and all of the collector chemical was added to the pulper. The results are set out in Table 20.

Set 21 (I and C)

For these tests, soaps were made up in advance, by saponification of the fatty acids mentioned in Table 21. The soap concentration was 0.6% on weight of paper and this was all added to the pulper. Results are shown in Table 21.

Set 22 (I and C)

Assessments were made under standard alkaline pulping and deinking conditions of two examples of the invention against two commercial standards. The collector chemicals were all added to the pulper. Results are shown in Table 22.

Set 23 (I and C)

Assessment was made under standard alkaline conditions, using additions of surface active agents to the pulper and SERFAX S100 soap to the cell. Results are shown in Table 23.

Set 24 (I)

Assessments were carried out on use of lanolin-derived surface active agents, alone, and at very low concentrations, 0.02 wt % total active ingredient, on paper weight. Table 24 sets out results following standard alkaline deinking, whilst Table 25 sets out results following deinking under pseudo-neutral conditions as described above.

Set 25 (I and C)

In these tests soaps were made up, in advance, by saponification of the fatty acids mentioned in the examples of Table 26, and compared with SERFAX DB. In each case the soap concentration was 0.6 wt % based on weight of paper. Results are shown in Table 26.

Set 26 (I and C)

In this assessment a collector chemical of the invention was compared against a commercial standard collector chemical not of the invention. Results are stated in Table 27, whilst Table 28 is a repeat.

Set 27

In these assessments a co-formulated collector chemical in accordance with the invention was compared to a leading commercial collector chemical system, this being an emulsified fatty acid 8000P added to the pulper, and a conventional soap SERFAX RP100 added to the cell. Results are shown in Table 29.

It will be appreciated that the terms "paper" and "paper products" have been widely used in this specification as shorthand terms for cellulose fiber mats wet laid by a non-woven process and is intended to include materials such as tissue, card and the like.

It is conventional in the art to state that the mechanical treatment of waste paper breaks the paper down in "fibers". That conventional terminology has been used in this specification. It will be appreciated that such "fibers" of broken-down paper may themselves comprise small fibrils, and that the method of the invention does not require that the waste paper be broken down into discrete, individual cellulose strands.

The terms "ink", "print" and "deinking" etc. are used herein in a broad sense to denote marking on paper, however produced, including by, for example, photocopying where it might otherwise strictly be said that the marking applied is not "ink", nor is applied by conventional "printing".

TABLE 1

| Example No. | SERFAX S100/ SOL/VOL pellets | | Brightness | | |
|---|---|---|---|---|---|
| | wt % in pulper | wt % in cell | Pre-flotation | Post-flotation | Float Gain |
| 1 | 0.2 | 0.2 | 52.8 | 65.5 | 12.7 |
| 2 | 0.4 | — | 52.3 | 67.3 | 15.1 |
| 3 | — | 0.4 | 51.0 | 64.2 | 13.2 |

TABLE 2

| Example No. | SERFAX S100 pellets | | Brightness | | |
|---|---|---|---|---|---|
| | wt % in pulper | wt % in cell | Pre-flotation | Post-flotation | Float Gain |
| C1 | — | 0.6 | 53.1 | 63.9 | 10.8 |

TABLE 3

| Example No. | Pulper Material(s) added | Pulper Amount (g) | Cell Material(s) added | Cell Amount (g) | Brightness Pre-flotation | Brightness Post-Flotation | Float Gain |
|---|---|---|---|---|---|---|---|
| C2 | — | — | SERFAX S100 | 1.2 | 53.1 | 63.9 | 10.8 |
| 4 | SOL/VOL | 0.018 | SERFAX S100 | 0.77 | 51.5 | 64.0 | 12.5 |
| 5 | SERFAX S100 SOL/VOL | 0.385 0.009 | SERFAX S100 SOL/VOL | 0.385 0.009 | 54.0 | 62.9 | 8.9 |
| 6 | — | — | SERFAX S100 SOL/VOL | 0.77 0.018 | 53.2 | 64.9 | 11.7 |

TABLE 4

| Example No. | SERFAX DB/ SOL/VOL pellets wt % in pulper | Brightness Pre-flotation | Brightness Post-flotation | Float Gain |
|---|---|---|---|---|
| 7 | 0.2 | 48.9 | 62.3 | 14.3 |
| 8 | 0.4 | 49.7 | 64.2 | 14.5 |
| 9 | 0.6 | 49.7 | 63.7 | 14.0 |
| 10 | 0.8 | 50.6 | 63.8 | 13.2 |

TABLE 5

| Example No. | SERFAX DB pellets wt % in pulper | Brightness Pre-flotation | Brightness Post-flotation | Float Gain |
|---|---|---|---|---|
| C3 | 0.2 | 50.0 | 63.0 | 13.0 |
| C4 | 0.4 | 49.6 | 62.7 | 13.1 |
| C5 | 0.6 | 49.4 | 63.5 | 14.1 |
| C6 | 0.8 | 49.3 | 63.7 | 14.4 |

TABLE 6

| Example No. | Soap/saa pellets Soap wt % | Soap/saa pellets saa wt % | wt % of pellets in pulper | wt % of pellets in cell | Brightness Pre-flotation | Brightness Post-flotation | Float Gain |
|---|---|---|---|---|---|---|---|
| C7 | SERFAX DB-100 | — | 0.2 | 0.2 | 52.1 | 64.0 | 11.9 |
| 11 | SERFAX DB-98.5 | SOL/VOL 1.5 | 0.2 | 0.2 | 52.6 | 65.3 | 12.7 |
| 12 | SERFAX DB-97.5 | SOL/VOL 2.5 | 0.2 | 0.2 | 53.1 | 64.2 | 11.1 |
| 13 | SERFAX DB-96.6 | SOL/VOL 3.4 | 0.2 | 0.2 | 52.2 | 64.3 | 12.1 |

TABLE 7

| Example No. | Soap wt % | saa wt % | wt % of pellets in pulper | wt % of pellets in cell | Brightness Pre-flotation | Brightness Post-flotation | Float Gain |
|---|---|---|---|---|---|---|---|
| C8 | SERFAX DB-100 | — | — | 0.4 | 53.7 | 63.9 | 10.2 |
| 14 | SERFAX DB-98.5 | SOL/VOL 1.5 | — | 0.4 | 53.3 | 64.7 | 11.4 |
| 15 | SERFAX DB-97.5 | SOL/VOL 2.5 | — | 0.4 | 53.2 | 63.9 | 10.7 |
| 16 | SERFAX DB-96.6 | SOL/VOL 3.4 | — | 0.4 | 53.5 | 63.8 | 10.3 |

TABLE 8

| Example No. | Soap wt % | saa wt % | wt % of pellets in pulper | wt % of pellets in cell | Brightness Pre-flotation | Brightness Post-flotation | Float Gain |
|---|---|---|---|---|---|---|---|
| 17 | SERFAX S100 | SOL/VOL | 0.4 | — | 47.5 | 62.0 | 14.5 |
| 18 | SERFAX S100 | SOL/VOL | 0.2 | 0.2 | 47.6 | 62.1 | 14.5 |
| 19 | SERFAX DB | SOL/VOL | 0.4 | — | 49.6 | 62.9 | 13.3 |

TABLE 9

| Example No. | Soap | wt % of pellets in pulper | wt % of pellets in cell | Brightness Pre-flotation | Brightness Post-flotation | Float Gain |
|---|---|---|---|---|---|---|
| C9 | SERFAX S100 | — | 0.6 | 47.6 | 61.4 | 13.8 |
| C10 | SERFAX DB | — | 0.6 | 50.0 | 61.7 | 11.7 |

TABLE 10

| Example No. | Soap | saa | wt % of pellets in pulper | wt % of pellets in cell | Brightness Pre-flotation | Brightness Post-flotation | Float Gain |
|---|---|---|---|---|---|---|---|
| 20 | SERFAX DB | SOL/VOL | — | 0.4 | 51.4 | 63.7 | 12.3 |
| C11 | SERFAX DB | VOL | — | 0.4 | 51.6 | 63.5 | 11.9 |
| 21 | SERFAX DB | SOL | — | 0.4 | 50.8 | 62.6 | 11.8 |
| C12 | SERFAX DB | CRODET S100 | — | 0.4 | 51.5 | 63.3 | 11.8 |
| 22 | SERFAX DB | SOL E | — | 0.4 | 51.2 | 64.1 | 12.9 |
| C13 | SERFAX DB | CRILLET 1 | — | 0.4 | 51.3 | 64.1 | 12.8 |

TABLE 11

| Example No. | Addition to pulper (wt %) | Addition to cell (wt %) | Brightness Pre-flotation | Brightness Post-flotation | Float Gain |
|---|---|---|---|---|---|
| 23 | 0.4 SERFAX DBE | — | 48.2 | 59.7 | 11.5 |
| 24 | — | 0.4 SERFAX DBE | 47.4 | 60.6 | 13.2 |
| C14 | 0.6 SERFAX DB | — | 47.0 | 59.6 | 13.6 |
| C15 | — | 0.6 SERFAX DB | 46.3 | 60.0 | 13.7 |

TABLE 11-continued

| Example No. | Addition to pulper (wt %) | Addition to cell (wt %) | Brightness Pre-flotation | Brightness Post-flotation | Float Gain |
|---|---|---|---|---|---|
| 25 | 0.008 E/VOL 0.392 SERFAX DB | — | 47.3 | 58.7 | 11.4 |
| 26 | 0.008 E/VOL | 0.392 SERFAX DB | 48.6 | 60.9 | 12.3 |

TABLE 12

| Example No. | Addition to pulper (wt %) | Addition to cell (wt %) | Brightness Pre-flotation | Brightness Post-flotation | Float Gain |
|---|---|---|---|---|---|
| 27 | 0.4 SERFAX DBE | — | 53.6 | 64.2 | 10.6 |
| 28 | — | 0.4 SERFAX DBE | 54.6 | 63.8 | 9.2 |
| C16 | 0.6 SERFAX DB | — | 54.8 | 65.7 | 10.9 |
| C17 | — | 0.6 SERFAX DB | 54.9 | 65.3 | 10.4 |
| 29 | 0.008 E/VOL 0.392 SERFAX DB | — | 53.7 | 64.1 | 10.4 |
| 30 | 0.008 E/VOL | 0.392 SERFAX DB | 53.5 | 65.1 | 11.4 |

TABLE 13

| Example No. | Addition to pulper (wt %) | Addition to cell (wt %) | Brightness Pre-flotation | Brightness Post-flotation | Float Gain |
|---|---|---|---|---|---|
| 31 | 0.4 SERFAX DBE | — | 49.3 | 63.0 | 13.7 |
| 32 | — | 0.4 SERFAX DBE | 47.7 | 63.5 | 15.8 |
| 33 | 0.2 SERFAX DBE | 0.2 SERFAX DBE | 47.9 | 63.2 | 15.3 |
| C18 | — | 0.4 SERFAX DB | 47.6 | 62.7 | 15.1 |
| 34 | 0.392 SERFAX DB | 0.008 E/VOL | 48.6 | 63.2 | 14.6 |
| 35 | 0.008 E/VOL | 0.392 SERFAX DB | 48.0 | 62.4 | 14.4 |

TABLE 14

| Example No. | Addition to pulper (wt %) | Addition to cell (wt %) | Brightness Pre-flotation | Brightness Post-flotation | Float Gain |
|---|---|---|---|---|---|
| 36 | 0.6 SERFAX DBE | — | 48.5 | 63.4 | 14.9 |
| 37 | 0.01 E/VOL | 0.6 SERFAX DB | 48.3 | 62.9 | 14.6 |

TABLE 15

| Example No. | Addition to pulper (wt %) | Addition to cell (wt %) | Brightness Pre-flotation | Brightness Post-flotation | Float Gain |
|---|---|---|---|---|---|
| 38 | 0.45 SERFAX DBE | — | 50.5 | 64.5 | 14.0 |
| 39 | 0.45 SERFAX DBL | — | 50.1 | 65.2 | 15.1 |
| C19 | 0.6 SERFAX DB | — | 49.3 | 64.8 | 15.5 |

TABLE 16

| Example No. | Addition to pulper (wt %) | Addition to cell (wt %) | Brightness Pre-flotation | Brightness Post-flotation | Float Gain |
|---|---|---|---|---|---|
| 40 | 0.4 SERFAX DBE | — | 48.6 | 57.6 | 9.0 |
| 41 | 0.6 SERFAX DBE | — | 49.7 | 58.5 | 8.8 |
| 42 | 0.2 SERFAX DBE | 0.2 SERFAX DBE | 49.4 | 57.9 | 8.4 |
| 43 | 0.3 SERFAX DBE | 0.3 SERFAX DBE | 49.0 | 58.4 | 9.4 |
| C20 | 0.5 SERFAX DB | — | 48.1 | 55.8 | 7.7 |
| C21 | 0.7 SERFAX DB | — | 48.3 | 57.9 | 9.6 |
| C22 | 0.25 SERFAX DB | 0.25 SERFAX DB | 48.6 | 57.7 | 9.1 |
| C23 | 0.35 SERFAX DB | 0.35 SERFAX DB | 48.4 | 57.4 | 9.0 |

TABLE 17

| Example No. | Addition to pulper (wt %) | Addition to cell (wt %) | Brightness Pre-flotation | Brightness Post-flotation | Float Gain |
|---|---|---|---|---|---|
| C24 | — | 0.6 SERFAX DB | 45.8 | 57.0 | 11.2 |
| 44 | 0.2 E/VOL | 0.4 SERFAX DB | 45.2 | 58.0 | 12.8 |
| 45 | 0.2 E/VOL | 0.5 SERFAX DB | 45.6 | 58.0 | 12.4 |
| 46 | 0.2 E/VOL | 0.6 SERFAX DB | 47.7 | 59.2 | 11.5 |

TABLE 18

| Example No. | Addition to pulper (each 0.15 wt % A.I.) | Addition to cell (wt %) | Brightness Pre-flotation | Brightness Post-flotation | Float Gain |
|---|---|---|---|---|---|
| 47 | HARTOLAN DIST | — | 47.4 | 53.4 | 6.0 |
| 48 | HARTOLAN TECH | — | 48.1 | 53.7 | 5.6 |
| 49 | WOOL PITCH | — | 46.4 | 53.6 | 7.2 |
| 50 | CHOLESTEROL | — | 46.6 | 52.3 | 5.7 |
| 51 | POLYCHLOL 5 | — | 46.5 | 52.0 | 5.5 |
| 52 | POLYCHLOL 40 | — | 46.3 | 58.1 | 11.8 |
| C25 | A100 | — | 47.8 | 56.7 | 8.9 |
| C26 | RS GAG | — | 47.3 | 56.2 | 8.9 |

TABLE 19

| Example No. | Addition to pulper (each 0.1 wt % A.I.) | Addition to cell (wt %) | Brightness Pre-flotation | Brightness Post-flotation | Float Gain |
|---|---|---|---|---|---|
| 53 | HARTOLAN DIST | — | 70.0 | 75.5 | 5.5 |
| 54 | HARTOLAN TECH | — | 69.9 | 76.6 | 6.7 |
| 55 | WOOL PITCH | — | 70.4 | 76.2 | 5.8 |
| 56 | CHOLESTEROL | — | 69.5 | 74.1 | 4.6 |
| 57 | POLYCHLOL 5 | — | 68.3 | 73.4 | 5.1 |
| 58 | POLYCHLOL 40 | — | 69.7 | 77.7 | 8.0 |
| C27 | A100 | — | 69.3 | 76.2 | 6.9 |
| C28 | RS GAG | — | 69.6 | 77.9 | 8.3 |

TABLE 20

| Example No. | Addition to pulper (each 0.6 wt % A.I.) | Addition to cell (wt %) | Brightness Pre-flotation | Brightness Post-flotation | Float Gain |
|---|---|---|---|---|---|
| 59 | LANOLIN ACID | — | 44.7 | 64.7 | 20.0 |
| 60 | LANFA TECH | — | 45.1 | 65.6 | 20.5 |
| 61 | AGNOSOL 5 | — | 45.3 | 65.1 | 19.8 |

TABLE 20-continued

| Example No. | Addition to pulper (each 0.6 wt % A.I.) | Addition to cell (wt %) | Brightness Pre-flotation | Brightness Post-flotation | Float Gain |
|---|---|---|---|---|---|
| 62 | AGNOSOL 24 | — | 45.7 | 65.7 | 20.0 |
| C29 | SERFAX DB | — | 44.7 | 65.5 | 20.8 |

TABLE 21

| Example No. | 0.6 wt % soap addition to pulper, fatty acid being: | Addition to cell (wt %) | Brightness Pre-flotation | Brightness Post-flotation | Float Gain |
|---|---|---|---|---|---|
| 63 | 100 wt % LANFA | — | 51.1 | 66.2 | 15.1 |
| 64 | 50 wt % LANFA 50 wt % palm oil fatty acids | — | 51.6 | 64.7 | 13.1 |
| 65 | 50 wt % LANFA 50 wt % tallow fatty acids | — | 51.4 | 65.4 | 14.0 |
| C30 | 60 wt % tallow fatty acids 40 wt % palm oil fatty acids | — | 51.3 | 66.1 | 14.8 |

TABLE 22

| Example No. | Addition to pulper (wt %) | Addition to cell (wt %) | Brightness Pre-flotation | Brightness Post-flotation | Float Gain |
|---|---|---|---|---|---|
| 66 | 0.2 AGNOSOL 24 | — | 47.2 | 60.8 | 13.6 |
| 67 | 0.1 LANEXOL | — | 47.0 | 62.0 | 15.0 |
| C31 | 0.2 LIONSURF 727 | — | 48.3 | 62.8 | 14.5 |
| C32 | 0.6 SERFAX DB | — | 48.4 | 62.0 | 13.6 |

TABLE 23

| Example No. | Addition to pulper (wt %) | Addition to cell (wt %) | Brightness Pre-flotation | Brightness Post-flotation | Float Gain |
|---|---|---|---|---|---|
| 68 | 0.01 SOL/VOL | 0.45 SERFAX S100 | 44.9 | 64.6 | 19.7 |
| 69 | 0.01 LAN/VOL | 0.45 SERFAX S100 | 44.8 | 63.9 | 19.1 |
| 70 | 0.01 LANEXOL | 0.45 SERFAX S100 | 45.7 | 64.8 | 19.1 |
| C33 | — | 0.6 SERFAX S100 | 45.0 | 64.5 | 19.5 |

TABLE 24

| Example No. | Addition to pulper (wt %) | Addition to cell (wt %) | Brightness Pre-flotation | Brightness Post-flotation | Float Gain |
|---|---|---|---|---|---|
| 71 | 0.02 E/VOL | — | 46.9 | 57.0 | 10.1 |
| 72 | 0.02 LAN/VOL | — | 47.4 | 58.0 | 10.6 |

TABLE 25

| Example No. | Addition to pulper (wt %) | Addition to cell (wt %) | Brightness Pre-flotation | Brightness Post-flotation | Float Gain |
|---|---|---|---|---|---|
| 73 | 0.02 E/VOL | — | 47.8 | 56.9 | 9.1 |
| 74 | 0.02 LAN/VOL | — | 49.3 | 59.3 | 10.1 |

TABLE 26

| Example No. | 0.6 wt % soap addition to pulper, fatty acid being: | Addition to cell (wt %) | Brightness Pre-flotation | Brightness Post-flotation | Float Gain |
|---|---|---|---|---|---|
| 75 | FLUILAN | — | 43.7 | 65.2 | 21.5 |
| 76 | CORONET | — | 46.1 | 64.3 | 18.2 |
| 77 | LANEXOL | — | 47.7 | 67.6 | 19.9 |
| C34 | SERFAX DB (the soap itself) | — | 45.5 | 65.7 | 20.2 |

TABLE 27

| Example No. | Addition to pulper (wt %) | Addition to cell (wt %) | Brightness Pre-flotation | Brightness Post-flotation | Float Gain |
|---|---|---|---|---|---|
| 78 | 0.15 LANEXOL | — | 52.3 | 67.7 | 15.4 |
| C35 | 0.2 LIONSURF 727 | — | 54.1 | 68.2 | 14.1 |

TABLE 28

| Example No. | Addition to pulper (wt %) | Addition to cell (wt %) | Brightness Pre-flotation | Brightness Post-flotation | Float Gain |
|---|---|---|---|---|---|
| 79 | 0.15 LANEXOL | — | 54.0 | 68.4 | 14.4 |
| C36 | 0.2 LIONSURF 727 | — | 53.3 | 68.1 | 14.8 |

TABLE 29

| Example No. | Addition to pulper (wt %) | Addition to cell (wt %) | Brightness Pre-flotation | Brightness Post-flotation | Float Gain |
|---|---|---|---|---|---|
| 80 | 0.25 SERFAX DBE | 0.25 SERFAX DBE | 52.2 | 62.8 | 10.6 |
| 81 | 0.15 SERFAX DBE | 0.15 SERFAX DBE | 52.1 | 63.4 | 11.3 |
| C37 | 0.65 8000P | 0.32 SERFAX RP100 | 52.1 | 62.6 | 10.5 |

I claim:

1. A process for recycling fiber products, the process comprising:
   (a) deinking pulp fibers having ink attached thereon over a pH range of from about pH 6 to pH 11.5 by contacting the pulp with an aqueous deinking medium having provided therein a deinking effective amount of both: component (1), a collector chemical surface active agent comprising at least one of ethoxylated lanolin and an ethoxylated fraction of lanolin wherein the fraction of lanolin is selected from the group consisting of ester fractions of lanolin; alcohol fractions of lanolin; polyol fractions of lanolin; acid fractions of lanolin; cholesterol fractions of lanolin; lanosterol fractions of lanolin; dihydrolanosterol fractions of lanolin; iso-$C_{14-36}$ fatty alcohols fractions of lanolin; anteiso-$C_{17-35}$ fatty alcohols fractions of lanolin; iso-$C_{8-40}$ fatty acids fractions of lanolin; anteiso-$C_{7-41}$ fatty acids fractions of lanolin; α-hydroxy fatty acids fractions of lanolin; ω-hydroxy fatty acids fractions of lanolin; and alkoxylates derivatives of any of the foregoing; and mixtures thereof, and component (2), another chemical selected from the group consisting of soap, surface active agents other than ethoxylated lanolin or ethoxylated lanolin fractions, and mixtures thereof;

(b) separating the ink detached from the fibers during the deinking step (a) to produce a pulp of deinked fibers; and (c) recovering cleansed fibers from the pulp of deinked fibers.

2. A process as claimed in claim 1 wherein component (1) comprises an ethoxylated lanolin fraction selected from the group consisting of ethoxylated lanolin alcohols, ethoxylated lanolin polyols, ethoxylated lanolin acids, esters of such ethoxylated lanolin alcohols, polyols and acids, and mixtures thereof.

3. A process as claimed in claim 1 wherein said components (1) and (2) together have a mean HLB value of at least 4.

4. A process as claimed in claim 1 which comprises a preliminary pulping stage which employs an aqueous medium, wherein the pH of the aqueous medium in the pulping stage is pH 9 or less.

5. A process as claimed in claim 1, which process is a flotation or wash deinking process, wherein the pH of the aqueous medium in the flotation or washing stage is pH 7.5 or less.

6. A process as claimed in claim 1 wherein said components (1) and (2) together have a mean HLB value of at least 10.

7. A process as claimed in claim 1 wherein said components (1) and (2) together have a mean HLB value of at least 14.

8. A process as claimed in claim 1 wherein component (2) comprises at least one of a $C_{12-22}$ fatty acid or soap thereof.

9. A process as claimed in claim 2 wherein component (2) is selected from the group consisting of alkoxylated n-$C_{8-26}$ fatty alcohols, esters of alkoxylated n-$C_{8-26}$ fatty alcohols, alkoxylated n-$C_{8-26}$ fatty acids, esters of alkoxylated n-$C_{8-26}$ fatty acids, and mixtures thereof.

10. A process according to claim 1 wherein components (1) and (2) are provided in a single phase co-formulation, which is added to water to provide said aqueous deinking medium.

11. A process according to claim 10 wherein component (1) comprises an ethoxylated wool grease which is ethoxylated to an extent of at least about 30 mole average ethoxy units.

12. A process according to claim 11 wherein the co-formulation is soluble in water at 40° C. and above.

13. A process according to claim 11 wherein the fiber products are paper products.

14. A process according to claim 10 wherein the co-formulation is soluble in water at 40° C. and above.

15. A process according to claim 1 wherein the fiber products are paper products.

16. A process according to claim 1 wherein the deinking occurs over a pH range of from about pH 6.5 to 7.5.

17. A process according to claim 1 wherein component (1) comprises an ethoxylated wool grease, ethoxylated to an extent of at least about 30 mole average ethoxy units, component (2) comprises at least one of a fatty acid or a soap thereof, and components (1) and (2) are provided in a co-formulation which is added to said aqueous deinking medium.

18. A process according to claim 17 wherein component (2) comprises at least one of a $C_{12-22}$ fatty acid or soap thereof.

* * * * *